(12) United States Patent
Ren et al.

(10) Patent No.: US 11,745,233 B2
(45) Date of Patent: Sep. 5, 2023

(54) SINGLE-SIDED TOWER-TYPE ROLLER SYSTEM BASED ASYNCHRONOUS ROLLING MILL FOR ROLLING ULTRA-THIN COMPOSITE STRIP AND HYDRAULIC SYSTEM

(71) Applicant: Taiyuan University of Technology, Taiyuan (CN)

(72) Inventors: Zhongkai Ren, Taiyuan (CN); Tao Wang, Dalian (CN); Xiao Liu, Taiyuan (CN); He Li, Hengshui (CN); Jianchao Han, Taiyuan (CN); Dongping He, Taiyuan (CN); Qingxue Huang, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 13 days.

(21) Appl. No.: 17/497,019

(22) Filed: Oct. 8, 2021

(65) Prior Publication Data
US 2023/0066668 A1    Mar. 2, 2023

(30) Foreign Application Priority Data
Sep. 1, 2021 (CN) .......................... 202111018760.1

(51) Int. Cl.
*B21B 1/22* (2006.01)
*B21B 13/02* (2006.01)

(52) U.S. Cl.
CPC ............... *B21B 1/22* (2013.01); *B21B 13/02* (2013.01)

(58) Field of Classification Search
CPC .. B21B 1/22; B21B 1/227; B21B 1/30; B21B 1/40; B21B 13/02; B21B 13/023; B21B 13/145; B21B 13/06; B21B 37/58
See application file for complete search history.

(56) References Cited

FOREIGN PATENT DOCUMENTS

| EP | 1607147 A1 * | 12/2005 | ............... B21B 1/40 |
| JP | 03238108 A * | 10/1991 | ............. B21B 1/227 |

\* cited by examiner

*Primary Examiner* — Debra M Sullivan
(74) *Attorney, Agent, or Firm* — Stuart H. Mayer

(57) ABSTRACT

A single-side tower-type roller system based asynchronous rolling mill for rolling an ultra-thin composite strip and a hydraulic system therefor are provided. The mill includes a machine frame and reel assemblies. An upper roller system assembly and a lower roller system assembly are arranged in the machine frame. A down-pressing assembly is arranged on the machine frame and used to adjust a roll gap between the upper roller system assembly and the lower roller system assembly. A support roller balance assembly is arranged on the machine frame and used to support and balance the upper roller system assembly. The lower roller system assembly includes right and left working rollers. The right working roller is a plain roller. The left working roller is a patterned roller. A left-pressing assembly is arranged on the machine frame and used to adjust a roll gap between the right and left working rollers.

8 Claims, 7 Drawing Sheets

SINGLE-SIDED TOWER-TYPE ROLLER SYSTEM BASED ASYNCHRONOUS ROLLING MILL FOR ROLLING ULTRA-THIN COMPOSITE STRIP AND HYDRAULIC SYSTEM

TECHNICAL FIELD

The disclosure relates to the technical field of rolling equipment, and particularly to a single-sided tower-type roller system based asynchronous rolling mill for rolling an ultra-thin composite strip and a hydraulic system.

DESCRIPTION OF RELATED ART

An ultra-thin composite strip has excellent properties of different materials, and have broad application prospects in important fields such as aerospace, military and national defense, electronic communication, micro-robots, etc. At present, main preparation methods of the ultra-thin composite strip are spray deposition, magnetron sputtering, diffusion welding and blank thinning Since the former two methods are complicated in production process and high in cost, they are not suitable for mass production. The ultra-thin composite strip prepared by the diffusion welding has a low bonding strength and a short service life. The ultra-thin composite strip prepared by the blank thinning method causes obvious work hardening and anisotropy, which aggravates the uncoordinated deformation of dissimilar metals and is prone to interface cracking.

SUMMARY

An objective of the disclosure is to provide a single-sided tower-type roller system based asynchronous rolling mill for rolling an ultra-thin composite strip and a hydraulic system, so as to solve the problems existing in the related art.

In order to achieve the above objective, the disclosure provides the following technical solutions.

A single-sided tower-type roller system based asynchronous rolling mill for rolling an ultra-thin composite strip is provided according to an embodiment of the disclosure, which includes a machine frame;

where the machine frame includes two groups of rectangular frames symmetrically arranged with respect to each other;

where reel assemblies are arranged at two opposite sides of the machine frame;

where an upper roller system assembly and a lower roller system assembly are arranged in the machine frame;

where a down-pressing assembly is arranged on the machine frame and used to adjust a roll gap between the upper roller system assembly and the lower roller system assembly;

where a support roller balance assembly is arranged on the machine frame and used to support and balance the upper roller system assembly; and where the lower roller system assembly includes a right working roller and a left working roller, the right working roller is a plain roller, the left working roller is a patterned roller, a left-pressing assembly is arranged on the machine frame and used to adjust a roll gap between the right working roller and the left working roller, and the right working roller and the left working roller are driven by a motor drive assembly.

In an embodiment, each of the reel assemblies may include: reel; and tandem motor, used to drive the reel to work, where a side of the reel close to the machine frame is provided with a guide roller, and the guide roller is rotatably connected to a guide roller support.

In an embodiment, the reel assemblies may include: two groups of unwinding reel assemblies, arranged at one of the two opposite sides of the machine frame; one group of winding reel assembly, arranged at the other of the two opposite sides of the machine frame, where the two groups of unwinding reel assemblies are arranged correspondingly in a manner of up and down, and the guide roller corresponding to a lower one of the two groups of unwinding reel assemblies is arranged at the roll gap between the right working roller and the left working roller.

In an embodiment, the upper roller system assembly may include: a six-roller system, arranged inside the two groups of rectangular frames; and a six-roller rack, arranged outside the six-roller system; where two opposite sides of the six-roller rack are individually provided with backing plates, and each of the backing plates is fixedly connected to the two groups of rectangular frames; and where the six-roller system includes an upper working roller, two first intermediate rollers arranged above and tangent to the upper working roller, and three second intermediate rollers arranged above the two first intermediate rollers, and axis centers of the upper working roller and the right working roller are located on a same vertical line.

In an embodiment, each of two ends of the six-roller system may be provided with a support end cover matched with the six-roller system, cylindrical protrusions are fixedly arranged on the support end cover and used to keep six rollers to be axially fixed; and two of the cylindrical protrusions corresponding to the two first intermediate rollers are two axial displacement hydraulic cylinders.

In an embodiment, each of two opposite ends of the right working roller may be provided with a right working roller bearing seat, each of two opposite ends of the left working roller is provided with a left working roller bearing seat; where the left-pressing assembly includes: the right working roller bearing seat and the left working roller bearing seat, arranged between two sides of a bottom portion of the same one of the two groups of rectangular frames; and a small wedge and a large wedge, arranged at a side of the left working roller bearing seat facing away from the right working roller bearing seat; where opposing surfaces of the small wedge and the large wedge are wedge-shaped surfaces; a groove is formed on a side of the same one group of rectangular frame close to the left working roller and used to accommodate the small wedge, and the large wedge is fixedly connected to a wedge displacement hydraulic cylinder.

In an embodiment, the down-pressing assembly may include a hydraulic cylinder, the hydraulic cylinder is fixedly connected to a corresponding one group of rectangular frame of the two groups of rectangular frames, a piston rod of the hydraulic cylinder goes through the corresponding one group of rectangular frame and is fixedly connected to a pressing head, the pressing head is connected to a pressure sensor, and the pressure sensor is connected to the six-roller rack.

In an embodiment, the support roller balance assembly may include a first balance beam fixedly connected onto the six-roller rack, and a second balance beam is fixedly connected between the two groups of rectangular frames; where the first balance beam is fixedly connected to an end of a spring guide rod, another end of the spring guide rod goes through the second balance beam and is fixedly connected to a locking member, and the spring guide rod is sleeved with a balance spring between the locking member and the second balance beam.

A hydraulic system is provided according to an embodiment of the disclosure, which is adapted for the single-sided tower-type roller system based asynchronous rolling mill described in any embodiment above, and the hydraulic system includes: an oil pipe assembly; a down-pressing servo hydraulic system, used to control an operation of the down-pressing assembly; and a horizontal roll-gap adjustment hydraulic system, used to control an operation of the left-pressing assembly. Specifically, the oil pipe assembly includes a control oil pipe, a main pressure oil pipe, a main oil return pipe and an oil drain pipe.

In an embodiment, the down-pressing servo hydraulic system may include a first down-pressing hydraulic system and a second down-pressing hydraulic system, and the first down-pressing hydraulic system and the second down-pressing hydraulic system have a same structure. Where the first down-pressing hydraulic system includes a first servo valve connected to the main oil return pipe; the first servo valve is connected to a first cartridge valve, a second cartridge valve and a third cartridge valve; the first cartridge valve, the second cartridge valve and the third cartridge valve are individually connected to the oil drain pipe; a first pressure reducing valve is connected between the first cartridge valve and the main pressure oil pipe; a first electromagnetic ball valve is connected between the control oil pipe and the main oil return pipe; the second cartridge valve and the third cartridge valve are individually connected to the first electromagnetic ball valve; the second cartridge valve is connected to a rod cavity of a first down-pressing cylinder; the third cartridge valve is connected to a rod-less cavity of the first down-pressing cylinder; and a first overflow valve is connected between the rod cavity of the first down-pressing cylinder and the main oil return pipe.

In an embodiment, the horizontal roll-gap adjustment hydraulic system may include a first horizontal roll-gap adjustment hydraulic system and a second horizontal roll-gap adjustment hydraulic system, and the first horizontal roll-gap adjustment hydraulic system and the second horizontal roll-gap adjustment hydraulic system have a same structure. Where the first horizontal roll-gap adjustment hydraulic system includes a first proportional reversing valve connected to the main oil return pipe; the first proportional reversing valve is connected to a first hydraulic controlled check valve, a second hydraulic controlled check valve and a third hydraulic controlled check valve; a third electromagnetic ball valve is connected between the control oil pipe and the main oil return pipe; the third electromagnetic ball valve is connected to the first hydraulic controlled check valve, the second hydraulic controlled check valve and the third hydraulic controlled check valve; the oil drain pipe is connected to the first hydraulic controlled check valve, the second hydraulic controlled check valve and the third hydraulic controlled check valve; a third pressure reducing valve is connected between the first hydraulic controlled check valve and the main pressure oil pipe; the second hydraulic controlled check valve and the third hydraulic controlled check valve are individually connected to the first hydraulic controlled check valve; the second hydraulic controlled check valve is connected to a rod cavity of a first horizontal roll-gap adjustment hydraulic cylinder; the third hydraulic controlled check valve is connected to a rod-less cavity of the first horizontal roll-gap adjustment hydraulic cylinder; and a third overflow valve is connected between the rod-less cavity of the horizontal roll-gap adjustment hydraulic cylinder and the main oil return pipe.

In an embodiment, the hydraulic system may further include a transverse displacement hydraulic system used to control operations of cylindrical protrusions; where the transverse displacement hydraulic system includes a first transverse displacement hydraulic system and a second transverse displacement hydraulic system, and the first transverse displacement hydraulic system and the second transverse displacement hydraulic system have a same structure.

Where the first transverse displacement hydraulic system includes a third proportional reversing valve connected to the main oil return pipe; the third proportional reversing valve is connected to a seventh hydraulic controlled check valve and an eighth hydraulic controlled check valve; a fifth electromagnetic ball valve is connected between the control oil pipe and the main oil return pipe; each of the fifth electromagnetic ball valve and the main oil return pipe is connected to the seventh hydraulic controlled check valve and an eighth hydraulic controlled check valve; a fifth pressure reducing valve is connected between the seventh hydraulic controlled check valve and the main pressure oil pipe; the eighth hydraulic controlled check valve is connected to a rod-less cavity of the first transverse displacement hydraulic cylinder; and a fifth overflow valve is connected between the rod-less cavity of the first transverse displacement hydraulic cylinder and the main oil return pipe.

Where the second transverse displacement hydraulic system includes a second transverse displacement hydraulic cylinder, a reversing oil path is connected between two rod cavities of the first transverse displacement hydraulic cylinder and the second transverse displacement hydraulic cylinder, a reversing valve is connected between the reversing oil path and the main pressure oil pipe; and a seventh overflow valve is connected between the reversing oil path and the main oil return pipe.

The disclosure may have following technical effects.

In the disclosure, a lateral displacement of the left working roller is adjusted by the left-pressing assembly, so that the roll gap between the right working roller and the left working roller is adjusted. Further, since the left working roller is the patterned roller, a microstructure rolling is formed on an upper surface of an ultra-thin belt. The upper roller system assembly is a six-roller structure, the upper roller system assembly can be depressed by two hydraulic cylinders on the machine frame, and the upper roller system assembly is combined with the right working roller to realize the rolling of two ultra-thin strips. In the disclosure, a rolled process and a rolling process are integrated into a rolling mill, in which: a microstructure is rolled first to achieve the modification purpose of a surface to be bonded, as such, the rolled microstructure generates a local strong stress at the interface to be bonded, thereby promoting the rupture of oxide film of the surface to be bonded and promoting outflow of fresh metal; coordinated deformation and high-strength combination of the two ultra-ultra-thin strips can be better promoted through asynchronous rolling and compounding. In the rolling process, tensions on the three reels are controlled by two motors connected in series, which can realize the high-precision control of a tiny tension on one hand, and realize the variable tension rolling of the ultra-thin strips with different thicknesses and materials on the other hand. The disclosure has advantages of simple structure, convenient adjustment and maintenance and low manufacturing cost.

BRIEF DESCRIPTION OF DRAWINGS

In order to explain embodiments of the disclosure or technical solutions in the related art more clearly, accompanying drawings referred in the embodiments will be briefly introduced hereinafter. It is apparent that the accompanying drawings in the following description are merely some embodiments of the disclosure, and other drawings can be obtained according to these accompanying drawings without a creative labor.

Figure 1:
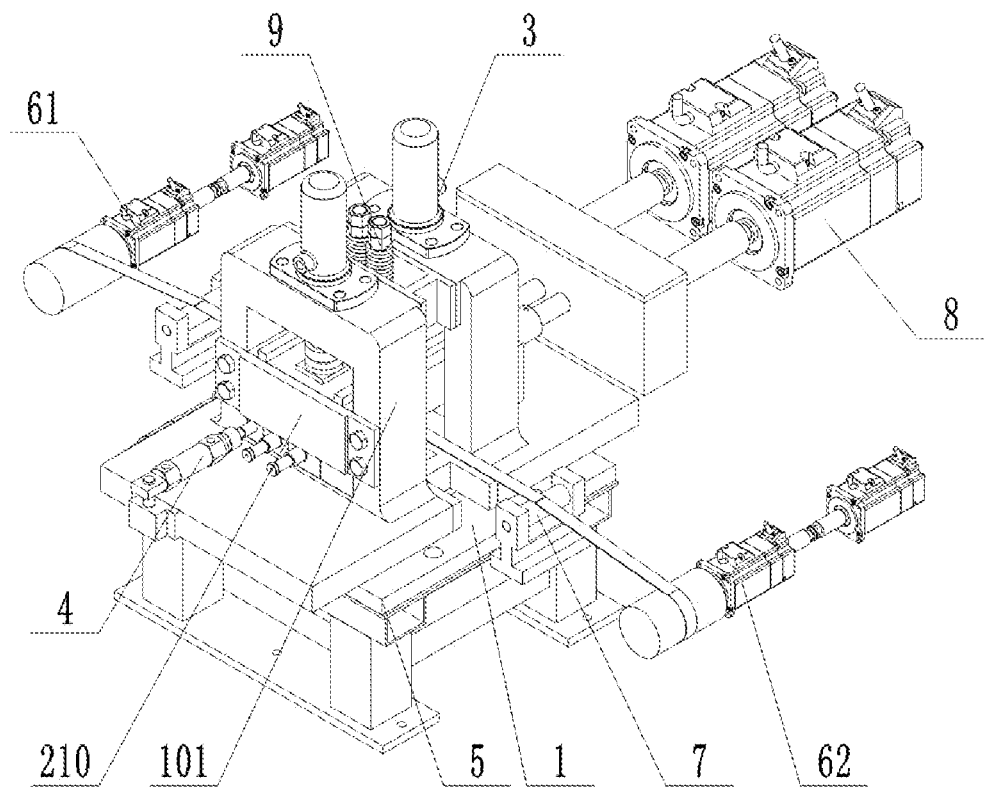
FIG. 1 is a schematic structural view of a single-sided tower-type roller system based asynchronous rolling mill for rolling an ultra-thin composite strip according to an embodiment of the disclosure.
Figure 2:
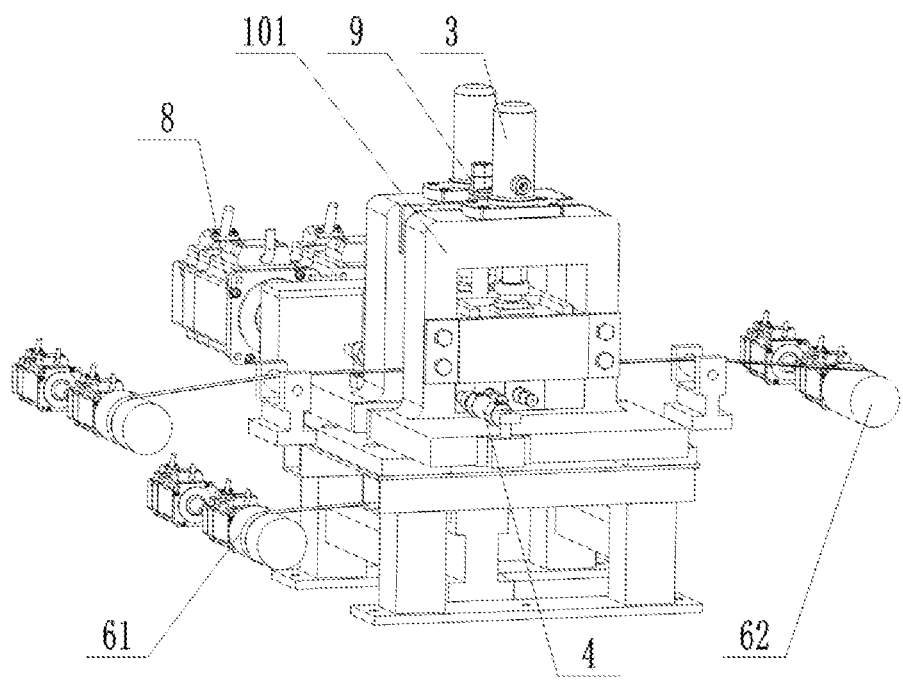
FIG. 2 is a schematic structural view of a single-sided tower-type roller system based asynchronous rolling mill for rolling an ultra-thin composite strip in a different view from that of FIG. 1 according to an embodiment of the disclosure.
Figure 3:
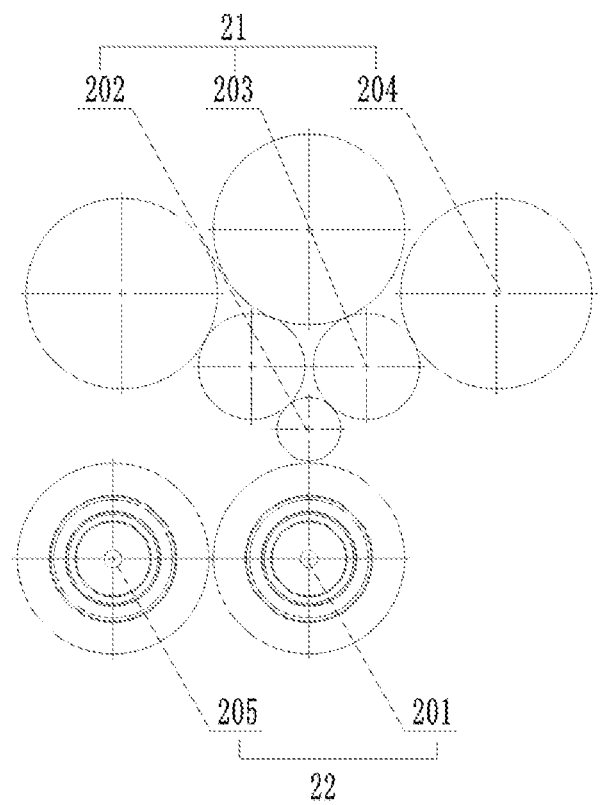
FIG. 3 is a schematic structural view of an upper roller system assembly and a lower roller system assembly according to an embodiment of the disclosure.
Figure 4:
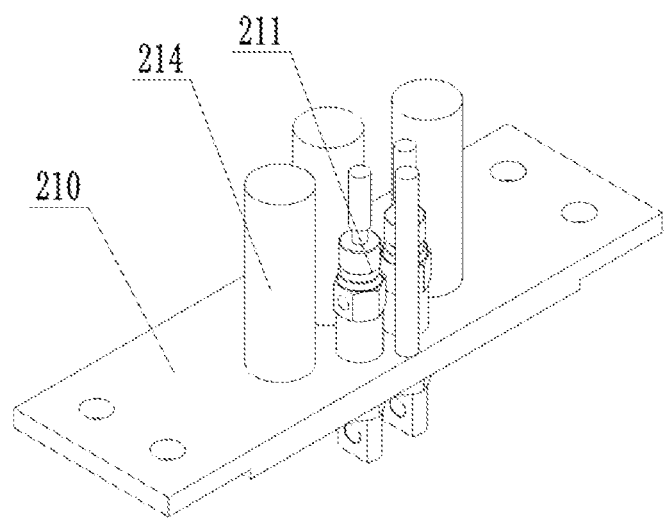
FIG. 4 is a schematic structural view of a support end cover according to an embodiment of the disclosure.
Figure 5:
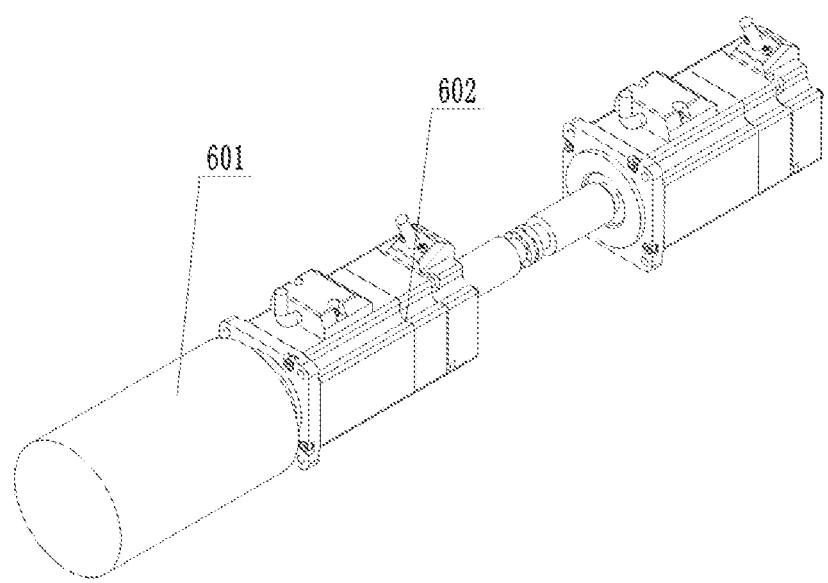
FIG. 5 is a schematic structural view of a reel assembly according to an embodiment of the disclosure.
Figure 6:
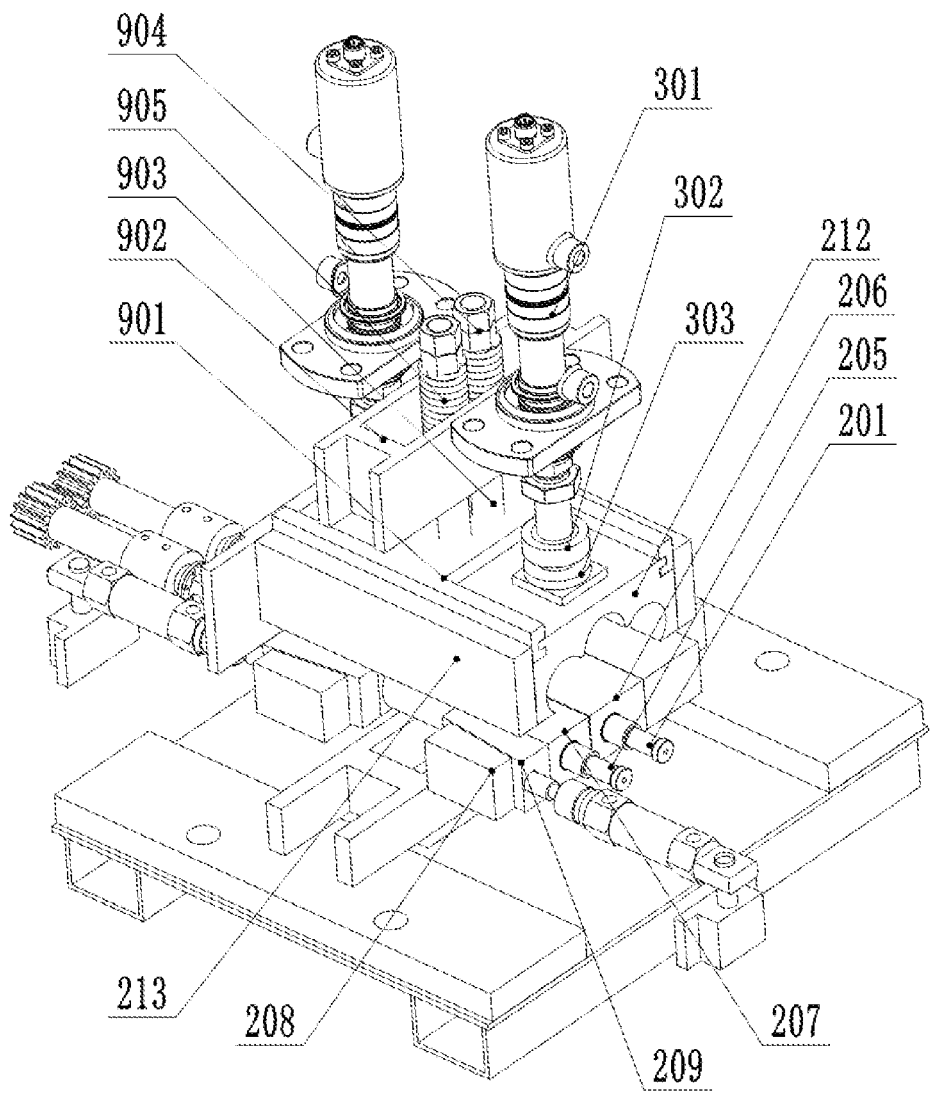
FIG. 6 is a schematic view of an internal structure of a rolling mill according to an embodiment of the disclosure.
Figure 7:
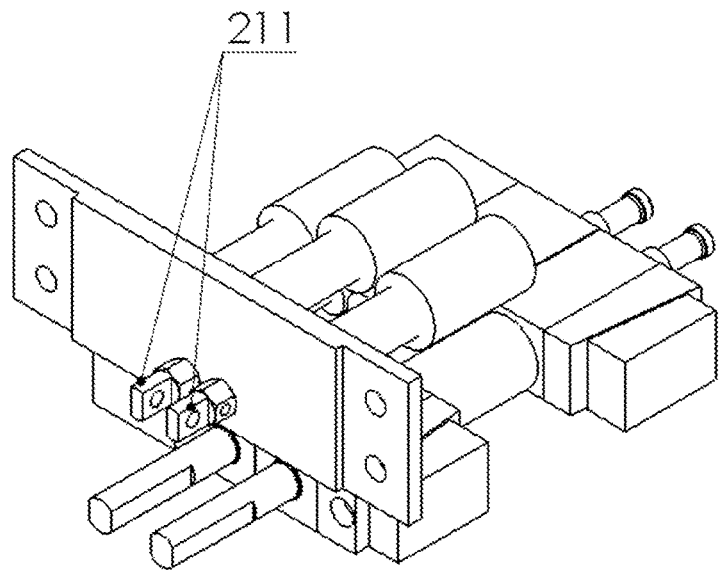
FIG. 7 is a schematic structural view of an axial displacement hydraulic cylinder according to an embodiment of the disclosure.

Reference numerals: 1—Machine frame; 101—Rectangular frame; 21—Upper roller system assembly; 22—Lower roller system assembly; 201—Right working roller; 202—Upper working roller; 203—First intermediate roller; 204—Second intermediate roller; 205—Left working roller; 206—Right working roller bearing seat; 207—Left working roller bearing seat; 208—Small wedge; 209—Large wedge; 210—Support end cover; 211—Axial displacement hydraulic cylinder; 212—Six-roller rack; 213—Backing plate; 214—Cylindrical protrusion; 3—Down-pressing assembly; 301—Hydraulic cylinder; 302—Pressing head; 303—Pressure sensor; 4—Left-pressing assembly; 5—Base; 601—Reel, 602—Tandem motor; 61—Unwinding reel assembly, 62—Winding reel assembly; 7—Guide roller; 8—Motor drive assembly; 9—Support roller balance assembly; 901—First balance beam; 902—Second balance beam; 903—Spring guide rod; 904—Locking member; 905—Balance spring; 1.1—First pressure reducing valve; 1.2—Second pressure reducing valve; 2.1—First cartridge valve; 2.2—Second cartridge valve; 2.3—Third cartridge valve; 2.4—Fourth cartridge valve; 2.5—Fifth cartridge valve; 2.6—Sixth cartridge valve; 3.1—First servo valve; 3.2—Second servo valve; 4.1—First electromagnetic ball valve; 4.2—Second electromagnetic ball valve; 5.1—First overflow valve; 5.2—Second overflow valve; 6.1—First down-pressing cylinder; 6.2—Second down-pressing cylinder; 7.1—First built-in displacement sensor; 7.2—Second built-in displacement sensor; 1.3 third pressure reducing valve; 1.4—Fourth pressure reducing valve; 4.3—Third electromagnetic ball valve; 4.4—Fourth electromagnetic ball valve; 5.3—Third overflow valve; 5.4—Fourth overflow valve; 7.3—Third built-in displacement sensor; 7.4—Fourth built-in displacement sensor; 8.1—First hydraulic controlled check valve; 8.2—Second hydraulic controlled check valve; 8.3—Third hydraulic controlled check valve; 8.4—Fourth hydraulic controlled check valve; 8.5—Fifth hydraulic controlled check valve; 8.6—Sixth hydraulic controlled check valve; 9.1—First proportional reversing valve; 9.2—Second proportional reversing valve; 10.1—First horizontal roll-gap adjustment hydraulic cylinder; 10.2—Second horizontal roll-gap adjustment hydraulic cylinder; 1.5—Fifth pressure reducing valve; 1.6—Sixth pressure reducing valve; 4.5—Fifth electromagnetic ball valve; 4.6—Sixth electromagnetic ball valve; 5.5—Fifth overflow valve; 5.6—Sixth overflow valve; 5.7—Seventh overflow valve; 7.5—Fifth built-in displacement sensor; 7.6—Sixth built-in displacement sensor; 8.7—Seventh hydraulic controlled check valve; 8.8—Eighth hydraulic controlled check valve; 8.9—Ninth hydraulic controlled check valve; 8.10—Tenth hydraulic controlled check valve; 9.3—Third proportional reversing valve; 9.4—Fourth proportional reversing valve; 11.1—First transverse displacement hydraulic cylinder; 11.2—Second transverse displacement hydraulic cylinder; 12—Reversing valve; X—Control oil pipe; P—Main pressure oil pipe; T—Main return oil pipe; Y—Drain oil pipe.

DETAILED DESCRIPTION OF EMBODIMENTS

Technical solutions in the embodiments of the disclosure will be described clearly and completely with reference to accompanying drawings in the embodiments of the disclosure. It is apparent that the described embodiments are only part of embodiments of the disclosure, not all of them. Based on the embodiments of the disclosure, all other embodiments obtained by ordinary technicians in the field without creative labor belong to the scope of protection of the disclosure.

In order to make above objectives, features and advantages of the disclosure more obvious and easy to understand, the disclosure will be further described in detail with reference to the accompanying drawings and specific embodiments.

Referring to FIGS. 1 through 7, an embodiment of the disclosure provides a single-sided tower-type roller system based asynchronous rolling mill for rolling an ultra-thin composite strip, which includes a machine frame 1. Specifically, the machine frame 1 may include two groups of rectangular frames 101, which are symmetrically arranged with respect to each other. Reel assemblies may be arranged at two opposite sides of the machine frame 1. Each of the reel assemblies may include a reel 601 and a tandem motor 602, and the tandem motor 602 is used to drive the reel 601 to work. A side of the reel 601 close to the machine frame 1 is provided with a guide roller 7, and the guide roller 7 is rotatably connected to a guide roller support. The reel assemblies may include two groups of unwinding reel assemblies 61 and one group of winding reel assembly 62, the two groups of unwinding reel assemblies 61 is arranged at one of the two opposite sides of the machine frame land used to unwind the ultra-thin composite strip, and the one group of winding reel assembly 62 is arranged at the other of the two opposite sides of the machine frame 1 and used to wind the ultra-thin composite strip. The two groups of unwinding reel assemblies 61 are arranged correspondingly in a manner of up and down. The two groups of unwinding reel assemblies 61 are used to unwind an ultra-thin composite strip in a winded state, and the one group of winding reel assembly 62 is used to wind an ultra-thin composite strip onto the reel 601.

In an embodiment, an upper roller system assembly 21 and a lower roller system assembly 22 may be arranged in the machine frame 1. A down-pressing assembly 3 is arranged on the machine frame 1 and used to adjust a roll gap between the upper roller system assembly 21 and the lower roller system assembly 22. A support roller balance assembly 9 is arranged on the machine frame 1 and used to support and balance the upper roller system assembly 21. The lower roller system assembly 22 may include a right working roller 201 and a left working roller 205. The right working roller 201 may be a plain roller, and the left working roller 205 may be a patterned roller. The right working roller 201 and the left working roller 205 have a same diameter and are located on a same horizontal plane, and a distance between axes of the right working roller 201 and the left working roller 205 is larger than a sum of semi-diameters of the right working roller 201 and the left working roller 205.

In an embodiment, the guide roller 7 corresponding to a lower one of the two groups of unwinding reel assemblies 61 may be arranged at the roll gap between the right working roller 201 and the left working roller 205, and is used to guide the ultra-thin strip. A left-pressing assembly 4 may be arranged on the machine frame 1 and used to adjust a roll gap between the right working roller 201 and the left working roller 205, and the right working roller 201 and the left working roller 205 may be driven by a motor drive assembly 8.

In an embodiment, the upper roller system assembly 21 may include: a six-roller system, arranged inside the two groups of rectangular frames 101; and a six-roller rack 212, arranged outside the six-roller system. Two opposite sides of the six-roller rack 212 may be individually provided with two backing plates 213, and each of the two backing plates 213 may be fixedly connected to the two groups of rectangular frames 101. The six-roller system may include an upper working roller 202, two first intermediate rollers 203 arranged above and tangent to the upper working roller 202, and three second intermediate rollers 204 arranged above the two first intermediate rollers 203, and axes of the upper working roller 202 and the right working roller 201 may be located on a same vertical line.

In an embodiment, each of two ends of the six-roller system may be provided with a support end cover 210 matched with the six-roller system, cylindrical protrusions 214 are fixedly arranged on the support end cover 210 and used to keep the six-roller system to be axially fixed; and two cylindrical protrusions 214 of the cylindrical protrusions 214 corresponding to the two first intermediate rollers 203 are two axial displacement hydraulic cylinders 211. The support end cover 210 is provided with six cylindrical protrusions 214, axes of the six cylindrical protrusions 214 are individually in a same horizontal line with axes of six rollers, and a diameter of each of the six cylindrical protrusions 214 is smaller than a diameter of a corresponding roller.

In an embodiment, each of two opposite ends of the right working roller 201 may be provided with a right working roller bearing seat 206, and each of two opposite ends of the left working roller 205 may be provided with a left working roller bearing seat 207. The left-pressing assembly 4 may include the right working roller bearing seat 206 and the left working roller bearing seat 207, arranged between two sides of a bottom portion of the same one of the two groups of rectangular frames 101, a small wedge 208 and a large wedge 209. The small wedge 208 and the large wedge 209 may be arranged at a side of the left working roller bearing seat 207 facing away from the right working roller bearing seat 206. Opposing surfaces of the small wedge 208 and the large wedge 209 may be wedge-shaped surfaces. A groove may be formed on a side of the same one group of rectangular frame 101 close to the left working roller 205 and used to accommodate the small wedge 208. The large wedge 209 may be fixedly connected to a hydraulic cylinder 301 with a wedge displacement.

In an embodiment, the down-pressing assembly 3 may include a hydraulic cylinder 301, which is fixedly connected to a corresponding one group of rectangular frame 101. A piston rod of the hydraulic cylinder 301 may go through the corresponding one group of rectangular frame 101 and may be fixedly connected to a pressing head 302. The pressing head 302 may be connected to a pressure sensor 303, and the pressure sensor 303 may be connected to the six-roller rack 212.

In an embodiment, the support roller balance assembly 9 may include a first balance beam 901 fixedly connected onto the six-roller rack 212, and a second balance beam 902 is fixedly connected between the two groups of rectangular frames 101. The first balance beam 901 is fixedly connected to an end of a spring guide rod 903, another end of the spring guide rod 903 goes through the second balance beam 902 and is fixedly connected to a locking member 904. The spring guide rod 903 is sleeved with a balance spring 905 between the locking member 904 and the second balance beam 904.

An operation process of the asynchronous rolling mill may include following seven steps.

In a first step, a composite ultra-thin strip is winded on a reel of the unwinding reel assembly 61 arranged in the down direction; through a corresponding guide roller 7 to the unwinding reel assembly 61, an end of the ultra-thin strip passes through the roll-gap between the right working roller 201 and the left working roller 205; then passes through the roll-gap between the right working roller 201 and the upper working roller 202; and then passes through the guide roller 7 corresponding to the winding reel assembly 62 to enable the ultra-thin strip to be fixed on a reel 601 of the winding reel assembly 62.

In a second step, another composite ultra-thin strip is winded on a reel 601 of the unwinding reel assembly 61 arranged in the up direction; through a corresponding guide roller 7 to the unwinding reel assembly 61, an end of this ultra-thin strip passes through the roll-gap between the right working roller 201 and the upper working roller 202; and then this ultra-thin strip is fixed on a reel 601 of the winding reel assembly 62 through a corresponding guide roller 7 to the winding reel assembly 62.

In a third step, relative positions of the above two ultra-thin strips are adjusted to keep the two ultra-thin strips in a same vertical plane.

In a fourth step, based on an initial thickness and a reduction amount of each of the two ultra-thin strips, the left working roller 205 is adjusted by the left-pressing assembly 4, so that the roll gap between the left working roller 205 and the right working roller 201 can meet a rolled condition. Further, the left working roller 205 is a patterned roller, and thus the upper surface of a rolled ultra-thin strip will have a microstructure.

In a fifth step, based on the initial thickness and the reduction amount of each of the two ultra-thin strips, the six-roller system is adjusted by the down-pressing assembly 3, so that the roll gap between the upper working roller 202 and the right working roller 201 can meet a rolling condition.

In a sixth step, a rotating speed of the motor is adjusted; the tandem motor is started; a proper tension is applied to each ultra-thin strip; the rotating speed of the motor is further adjusted according to a speed ratio required in the process; and the motor drive assembly 8 is started to drive the left and right working rolls for finishing rolling and rolled processes.

In a seventh step, a shape of the strip rolled by the rolling mill is measured by a shape meter, and then after the shape is fed back the hydraulic cylinder 211 pushes the first intermediate roller to move transversely to realize the control of the shape of the strip.

Figure 8:
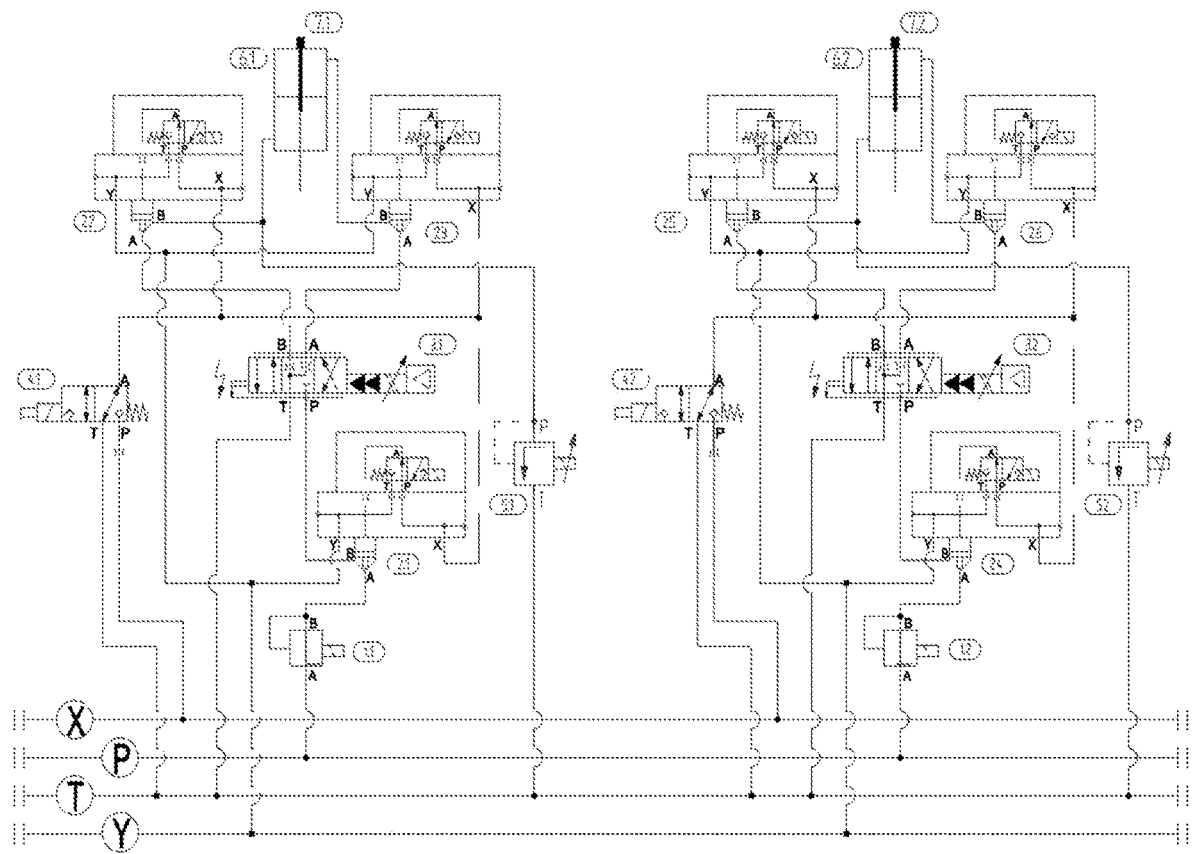
FIG. 8 is a schematic view of the structure of a down-pressing servo hydraulic system according to an embodiment of the disclosure.
Figure 9:
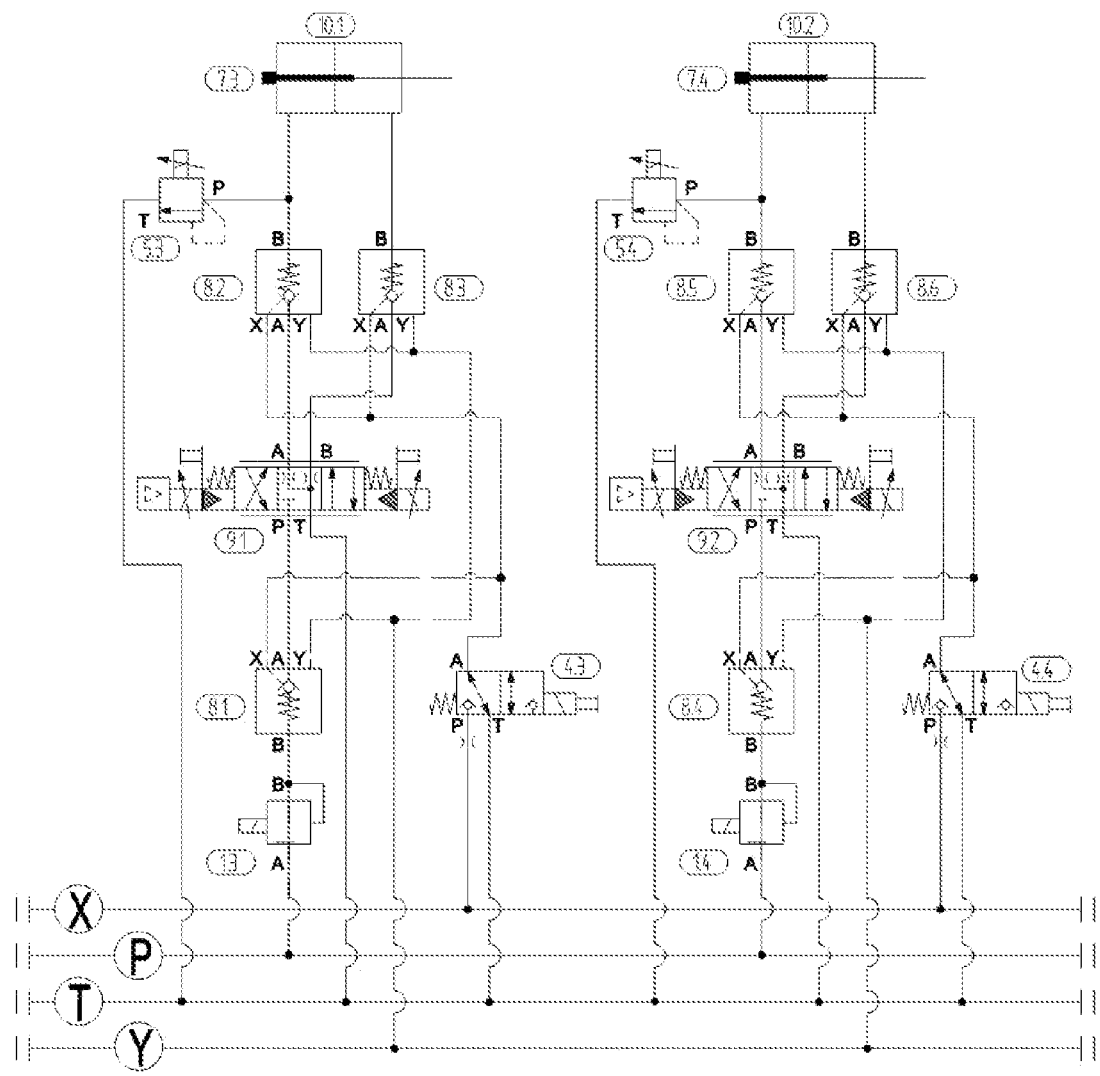
FIG. 9 is a schematic structural view of a horizontal roll-gap adjustment hydraulic system according to an embodiment of the disclosure.
Figure 10:
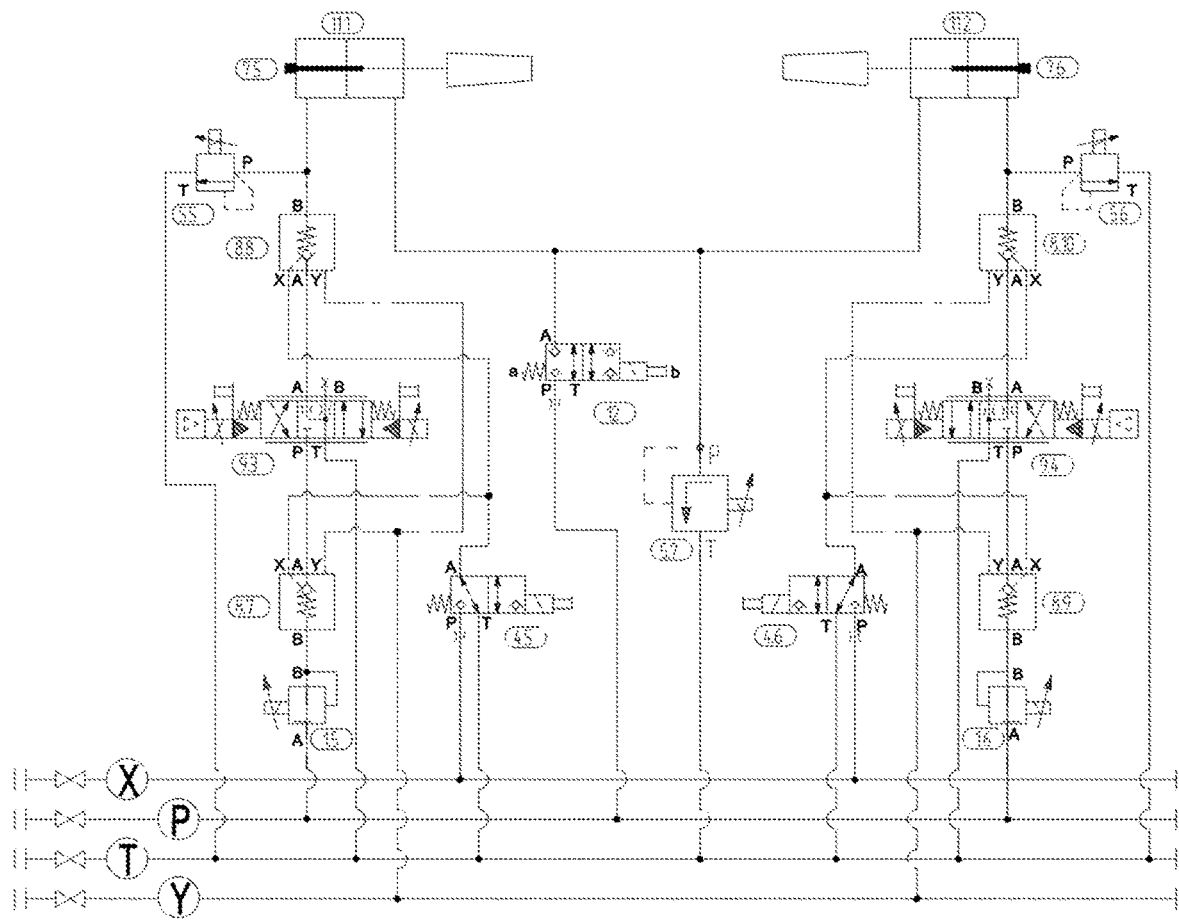
FIG. 10 is a schematic structural view of a transverse displacement hydraulic system according to an embodiment of the disclosure.

Referring to FIGS. 8 through 10, an embodiment of the disclosure provides a hydraulic system, which is adapted for the single-sided tower-type roller system based asynchronous rolling mill for rolling the ultra-thin composite strip described above. The hydraulic system may include: an oil pipe assembly; a down-pressing servo hydraulic system, used to control an operation of the down-pressing assembly 3; and a horizontal roll-gap adjustment hydraulic system, used to control an operation of the left-pressing assembly 4. The oil pipe assembly may include a control oil pipe X, a main pressure oil pipe P, a main oil return pipe T and an oil drain pipe Y.

In an embodiment, the down-pressing servo hydraulic system may include a first down-pressing hydraulic system and a second down-pressing hydraulic system, and the first down-pressing hydraulic system and the second down-pressing hydraulic system have a same structure. The first down-pressing hydraulic system may include a first servo valve 3.1 connected to the main oil return pipe T. The first servo valve 3.1 is connected to a first cartridge valve 2.1, a second cartridge valve 2.2 and a third cartridge valve 2.3. The first cartridge valve 2.1, the second cartridge valve 2.2 and the third cartridge valve 2.3 are individually connected to the oil drain pipe Y. A first pressure reducing valve 1.1 is connected between the first cartridge valve 2.1 and the main pressure oil pipe P. A first electromagnetic ball valve 4.1 is connected between the control oil pipe X and the main oil return pipe T. The second cartridge valve 2.2 and the third cartridge valve 2.3 are individually connected to the first electromagnetic ball valve 4.1. The second cartridge valve 2.2 is connected to a rod cavity of a first down-pressing cylinder 6.1. The third cartridge valve 2.3 is connected to a rod-less cavity of the first down-pressing cylinder 6.1. A first overflow valve 5.1 is connected between the rod cavity of the first down-pressing cylinder 6.1 and the main oil return pipe T. A first built-in displacement sensor 7.1 is installed inside a piston rod of the first down-pressing cylinder 6.1. Accurate control of a displacement of the piston rod of the first down-pressing cylinder 6.1 is achieved by a dynamic adjustment of a position closed loop formed by the first down-pressing cylinder 6.1 and the first servo valve 3.1 through the first built-in displacement sensor 7.1.

In an embodiment, the second down-pressing hydraulic system may include a second pressure reducing valve 1.2, a fourth cartridge valve 2.4, a fifth cartridge valve 2.5, a sixth cartridge valve 2.6, a second servo valve 3.2, a second electromagnetic ball valve 4.2, a second overflow valve 5.2, and a second down-pressing cylinder 6.2. Principles and structures of the first down-pressing hydraulic system and the second down-pressing hydraulic system are the same. A second built-in displacement sensor 7.2 is installed inside a piston rod of the second down-pressing cylinder 6.2. Accurate control of a displacement of the piston rod of the second down-pressing cylinder 6.2 is achieved by a dynamic adjustment of a position closed loop formed by the second down-pressing cylinder 6.2 and the second servo valve 3.2 through the second built-in displacement sensor 7.2.

In an embodiment, the horizontal roll-gap adjustment hydraulic system may include a first horizontal roll-gap adjustment hydraulic system and a second horizontal roll-gap adjustment hydraulic system, and the first horizontal roll-gap adjustment hydraulic system and the second horizontal roll-gap adjustment hydraulic system have a same structure. The first horizontal roll-gap adjustment hydraulic system may include a first proportional reversing valve 9.1 connected to the main oil return pipe T. The first proportional reversing valve 9.1 is connected to a first hydraulic controlled check valve 8.1, a second hydraulic controlled check valve 8.2 and a third hydraulic controlled check valve 8.3. A third electromagnetic ball valve 4.3 is connected between the control oil pipe X and the main oil return pipe T. The third electromagnetic ball valve 4.3 is connected to the first hydraulic controlled check valve 8.1, the second hydraulic controlled check valve 8.2 and the third hydraulic controlled check valve 8.3. The oil drain pipe Y is connected to the first hydraulic controlled check valve 8.1, the second hydraulic controlled check valve 8.2 and the third hydraulic controlled check valve 8.3. A third pressure reducing valve 1.3 is connected between the first hydraulic controlled check valve 8.1 and the main pressure oil pipe P. The second hydraulic controlled check valve 8.2 and the third hydraulic controlled check valve 8.3 are individually connected to the first hydraulic controlled check valve 8.1. The second hydraulic controlled check valve 8.2 is connected to a rod cavity of a first horizontal roll-gap adjustment hydraulic cylinder 10.1. The third hydraulic controlled check valve 8.3 is connected to a rod-less cavity of the first horizontal roll-gap adjustment hydraulic cylinder 10.1. A third overflow valve 5.3 is connected between the rod-less cavity of the first horizontal roll-gap adjustment hydraulic cylinder 10.1 and the main oil return pipe T. Accurate control of a displacement of a piston rod of the first horizontal roll-gap adjustment hydraulic cylinder 10.1 is achieved by a dynamic adjustment of a position closed loop formed by the horizontal roll-gap adjustment hydraulic cylinder and the first proportional reversing valve 9.1 through the third built-in displacement sensor 7.3.

In an embodiment, principles and structures of the first horizontal roll-gap adjustment hydraulic cylinder and the second horizontal roll-gap adjustment hydraulic cylinder are the same. The second horizontal roll gap adjustment hydraulic system includes a fourth pressure reducing valve 1.4, a fourth hydraulic controlled check valve 8.4, a second proportional reversing valve 9.2, a fifth hydraulic controlled check valve 8.5, a sixth hydraulic controlled check valve 8.6, a fourth electromagnetic ball valve 4.4, a fourth overflow valve 5.4 and a second horizontal roll-gap adjustment hydraulic cylinder 10.2. A fourth built-in displacement sensor 7.4 is installed inside a piston rod of the second horizontal roll-gap adjustment hydraulic cylinder 10.2. Accurate control of a displacement of a piston rod of the second horizontal roll-gap adjustment hydraulic cylinder 10.2 is achieved by a dynamic adjustment of a position closed loop formed by the second horizontal roll-gap adjustment hydraulic cylinder 10.2 and the second proportional reversing valve 9.2 through the fourth built-in displacement sensor 7.4.

In an embodiment, the hydraulic system may further include a transverse displacement hydraulic system, which is used to control operations of cylindrical protrusions 211. The transverse displacement hydraulic system may include a first transverse displacement hydraulic system and a second transverse displacement hydraulic system, and the first transverse displacement hydraulic system and the second transverse displacement hydraulic system have a same structure.

In an embodiment, the first transverse displacement hydraulic system may include a third proportional reversing valve 9.3 connected to the main oil return pipe T. The third proportional reversing valve 9.3 is connected to a seventh hydraulic controlled check valve 8.7 and an eighth hydraulic controlled check valve 8.8. A fifth electromagnetic ball valve 4.5 is connected between the control oil pipe X and the main oil return pipe T. Each of the fifth electromagnetic ball valve 4.5 and the main oil return pipe T is connected to the seventh hydraulic controlled check valve 8.7 and an eighth hydraulic controlled check valve 8.8. A fifth pressure reducing valve 1.5 is connected between the seventh hydraulic controlled check valve 8.7 and the main pressure oil pipe P. The eighth hydraulic controlled check valve 8.8 is connected to a rod-less cavity of the first transverse displacement hydraulic cylinder 11.1. A fifth overflow valve 5.5 is connected between the rod-less cavity of the first transverse displacement hydraulic cylinder 11.1 and the main oil return pipe T. A fifth built-in displacement sensor 7.5 is installed inside a piston rod of the first transverse displacement hydraulic cylinder 11.1.

In an embodiment, principles and structures of the first traversing hydraulic system and the second traversing hydraulic system are the same. The second traversing hydraulic system may include a sixth pressure reducing valve 1.6, a ninth hydraulic controlled check valve 8.9, a fourth proportional reversing valve 9.4, a tenth hydraulic controlled check valve 8.10, a second traversing hydraulic cylinder 11.2, a sixth electromagnetic ball valve 4.6 and a sixth overflow valve 5.6. A sixth built-in displacement sensor 7.6 is installed inside a piston rod of the second traversing hydraulic cylinder 11.2. A reversing oil path is connected between two rod cavities of the first transverse displacement hydraulic cylinder 11 and the second transverse displacement hydraulic cylinder 12. A reversing valve 12 is connected between the reversing oil path and the main pressure oil pipe P. A seventh overflow valve 5.7 is connected between the reversing oil path and the main oil return pipe T.

Accurate control of a displacement of a piston rod of the first transverse displacement hydraulic cylinder 11.1 is achieved by a dynamic adjustment of a position closed loop formed by the first transverse displacement hydraulic cylinder 11.1 and the third proportional reversing valve 9.3 through the fifth built-in displacement sensor 7.5. Accurate control of a displacement of a piston rod of the second transverse displacement hydraulic cylinder 11.2 is achieved by a dynamic adjustment of a position closed loop formed by the second transverse displacement hydraulic cylinder 11.2 and the fourth proportional reversing valve 9.4 through the sixth built-in displacement sensor 7.6.

In the description of the disclosure, it should be understood that terms "vertical", "horizontal", "upper", "lower", "front", "rear", "left", "right", "vertical", "horizontal", "top", "bottom", "inner" and "outer" indicate orientation or positional relationships based on the orientation shown in the accompanying drawings. It is merely for convenience of describing the disclosure, and does not indicate or imply that the referred device or element needs to have a specific orientation, or needs to be constructed and operated in the specific orientation, thus it cannot be understood as limiting the disclosure.

The above embodiments merely describe the preferred implements of the disclosure, but do not limit the scope of the disclosure. Without departing from the design spirit of the disclosure, various modifications and improvements made by ordinary technicians in the field to the technical solutions of the disclosure shall fall within the protection scope determined by the claims of the disclosure.

What is claimed is:

1. A single-sided tower-type roller system based asynchronous rolling mill for rolling an ultra-thin composite strip, comprising a machine frame which includes:

two groups of rectangular frames symmetrically arranged with respect to each other;

reel assemblies as an upper roller system assembly and a lower roller system assembly which are arranged at two opposite sides of the machine frame;

a down-pressing assembly arranged on the machine frame and configured to adjust a roll gap between the upper roller system assembly and the lower roller system assembly;

a support roller balance assembly arranged on the machine frame and configured to support and balance the upper roller system assembly; and wherein the lower roller system assembly comprises a right working roller and a left working roller, the right working roller is a plain roller, the left working roller is a patterned roller, a left-pressing assembly is arranged on the machine frame and configured to adjust a roll gap between the right working roller and the left working roller, and the right working roller and the left working roller are driven by a motor drive assembly.

2. The single-sided tower-type roller system based asynchronous rolling mill according to claim 1, wherein each of the reel assemblies comprises:

a reel; and a tandem motor, configured to drive the reel to work;

wherein a side of the reel close to the machine frame is provided with a guide roller, and the guide roller is rotatably connected to a guide roller support.

3. The single-sided tower-type roller system based asynchronous rolling mill according to claim 2, wherein the reel assemblies comprise:

two groups of unwinding reel assemblies, arranged at one of the two opposite sides of the machine frame; and one group of winding reel assembly, arranged at the other of the two opposite sides of the machine frame;

wherein the two groups of unwinding reel assemblies are arranged vertical with respect to one another, and the guide roller corresponding to a lower one of the two groups of unwinding reel assemblies is arranged at the roll gap between the right working roller and the left working roller.

4. The single-sided tower-type roller system based asynchronous rolling mill according to claim 1, wherein the upper roller system assembly comprises:

a six-roller system, arranged inside the two groups of rectangular frames; and a six-roller rack, arranged outside the six-roller system;

wherein two opposite sides of the six-roller rack are individually provided with backing plates, and each of the backing plates is fixedly connected to the two groups of rectangular frames; and wherein the six-roller system comprises an upper working roller, two first intermediate rollers arranged above and tangent to the upper working roller, and three second intermediate rollers arranged above the two first intermediate rollers, and axis centers of the upper working roller and the right working roller are located on a same vertical line.

5. The single-sided tower-type roller system based asynchronous rolling mill according to claim 4, wherein each of two ends of the six-roller system is provided with a support end cover matched with the six-roller system, cylindrical protrusions are fixedly arranged on the support end cover and configured to keep six rollers to be axially fixed; and two of the cylindrical protrusions corresponding to the two first intermediate rollers are two axial displacement hydraulic cylinders.

6. The single-sided tower-type roller system based asynchronous rolling mill according to claim 4, wherein the down-pressing assembly comprises a hydraulic cylinder, the hydraulic cylinder is fixedly connected to a corresponding one group of rectangular frame of the two groups of rectangular frames, a piston rod of the hydraulic cylinder goes through the corresponding one group of rectangular frame and is fixedly connected to a pressing head, the pressing head is connected to a pressure sensor, and the pressure sensor is connected to the six-roller rack.

7. The single-sided tower-type roller system based asynchronous rolling mill according to claim 4, wherein the support roller balance assembly comprises a first balance beam fixedly connected onto the six-roller rack, and a second balance beam is fixedly connected between the two groups of rectangular frames;

wherein the first balance beam is fixedly connected to an end of a spring guide rod, another end of the spring guide rod goes through the second balance beam and is fixedly connected to a locking member, and the spring guide rod is sleeved with a balance spring between the locking member and the second balance beam.

8. The single-sided tower-type roller system based asynchronous rolling mill according to claim 1, wherein each of two opposite ends of the right working roller is provided with a right working roller bearing seat, each of two opposite ends of the left working roller is provided with a left working roller bearing seat;

wherein the left-pressing assembly comprises:

the right working roller bearing seat and the left working roller bearing seat, arranged between two sides of a bottom portion of the same one of the two groups of rectangular frames; and a small wedge and a large wedge, arranged at a side of the left working roller bearing seat facing away from the right working roller bearing seat;

wherein opposing surfaces of the small wedge and the large wedge are wedge-shaped surfaces, a groove is formed on a side of the same one group of rectangular frame close to the left working roller and configured to accommodate the small wedge, and the large wedge is fixedly connected to a wedge displacement hydraulic cylinder.

* * * * *